(12) United States Patent
Duparre et al.

(10) Patent No.: US 7,920,342 B2
(45) Date of Patent: Apr. 5, 2011

(54) OVER-MOLDED GLASS LENSES AND METHOD OF FORMING THE SAME

(75) Inventors: Jacques Duparre, Jena (DE); Steve Oliver, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 188 days.

(21) Appl. No.: 12/216,222

(22) Filed: Jul. 1, 2008

(65) Prior Publication Data

US 2010/0002312 A1  Jan. 7, 2010

(51) Int. Cl.
*G02B 9/00* (2006.01)
(52) U.S. Cl. .......................... 359/796; 359/741
(58) Field of Classification Search .................. 359/796, 359/797, 741
See application file for complete search history.

(56) References Cited

U.S. PATENT DOCUMENTS

| | | | |
|---|---|---|---|
| 4,571,036 A * | 2/1986 | Gebelein et al. | 359/364 |
| 4,577,935 A * | 3/1986 | Yamakawa et al. | 359/651 |
| 4,594,288 A | 6/1986 | Dobigny et al. | |
| 4,615,847 A | 10/1986 | Howden | |
| 4,657,354 A * | 4/1987 | Kobayashi | 359/718 |
| 4,890,911 A * | 1/1990 | Sulc et al. | 351/160 H |
| 5,220,359 A * | 6/1993 | Roffman | 351/177 |
| 5,732,990 A * | 3/1998 | Yavitz et al. | 294/1.2 |
| 6,084,724 A * | 7/2000 | Wiegand et al. | 359/796 |
| 6,348,999 B1 | 2/2002 | Summersgill et al. | |
| 6,738,196 B2 * | 5/2004 | Yamamoto | 359/680 |
| 7,599,120 B2 * | 10/2009 | Nakagawa | 359/642 |
| 2002/0114084 A1 * | 8/2002 | Summersgill et al. | 359/742 |
| 2005/0162733 A1 | 7/2005 | Cho et al. | |
| 2005/0221105 A1 * | 10/2005 | Quinn et al. | 428/500 |
| 2006/0012889 A1 * | 1/2006 | Kojima et al. | 359/741 |
| 2006/0215281 A1 * | 9/2006 | Suzuki et al. | 359/754 |
| 2007/0009223 A1 | 1/2007 | Rudmann et al. | |
| 2009/0290833 A1 * | 11/2009 | Han et al. | 385/14 |
| 2010/0027114 A1 * | 2/2010 | Zuidema et al. | 359/463 |
| 2010/0134905 A1 * | 6/2010 | Hirao et al. | 359/793 |

FOREIGN PATENT DOCUMENTS

JP   2006-337985    12/2006
WO  WO 03/069741 A2   8/2003

OTHER PUBLICATIONS

Current Trends of Fabrication Technologies of DOE's and New Applications (Jyrki Saarinen an Markus Rossi Heptagon, Espoo Office Tekniikantie 12, FIN-02150 Espoo, Finland Heptagon, Zurich Office Badenerstrasse 569, CH-8048 Zurich, Switzerland) (www.heptagon.fi/downloads/Trends%20of%20Fabrication%20Technologies%202003).

Wafer-scale replication of optical components on VCSEL wafers (Chr. Gimkiewicz, Chr. Zschokke, S. Obi, C. Urban, J. S. Pedersen, and M. T. Gale CSEM Centre Suissr d'Electronique el de Uicmrechnique U, Badenerstrase 569, 8048 Zurich. Swicerlond M. Moser Avolon Photonics Lld., Badenerslrasse J69.8048 ZUnch. Fiiterlond) (ieeexplore.ieee.org.xpls/abs_all.jsp?arnumber=1359217).

* cited by examiner

*Primary Examiner* — Jordan M. Schwartz

(57) ABSTRACT

Accurate lens substrates on a waferscale are obtained by forming a polymer material on a lens surface formed on a lens wafer. The substrate may also be thinned by the glass lens surface forming process at the portion of the lens. The polymer material may have the same or different optical properties (refractive index and dispersion) as the lens wafer.

11 Claims, 13 Drawing Sheets

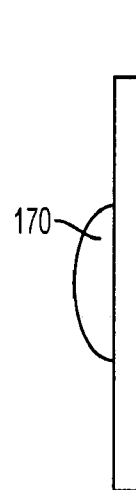  
FIG. 10A   FIG. 10B   FIG. 10C
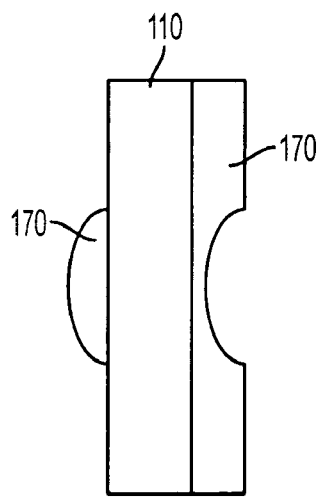  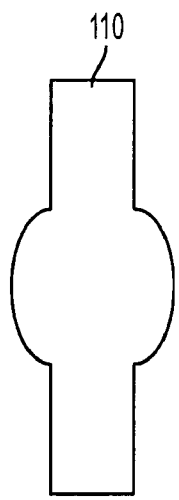 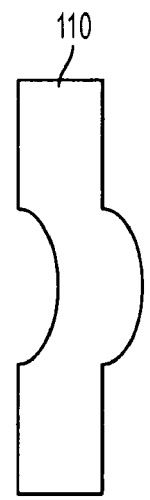
FIG. 10D   FIG. 10E   FIG. 10F   FIG. 10G

OVER-MOLDED GLASS LENSES AND METHOD OF FORMING THE SAME

FIELD OF THE INVENTION

The embodiments described herein relate to optical lens devices and formation methods, particularly for use in imaging devices.

BACKGROUND OF THE INVENTION

Microelectronic imagers are used in digital cameras, wireless devices with picture-taking capabilities, and many other applications. Mobile telephones and personal digital assistants (PDAs), for example, are incorporating microelectronic imagers for capturing and sending pictures. The growth rate of microelectronic imagers has been steadily increasing as they become smaller and produce better images with higher resolution.

Microelectronic imagers include image sensors that typically may use charged coupled devices (CCDs) and complementary metal-oxide semiconductor (CMOS) devices or other solid state image sensors. CCD image sensors have been widely used in digital cameras and other applications. CMOS image sensors are also quickly becoming very popular because they have low production costs, high yields, small sizes and low power requirements.

In practice, imager modules are fabricated in mass rather than individually. Multiple imager dies, each die including an imager array, are fabricated on an imager wafer. In addition, multiple lens structures, corresponding in number and location to the imager dies on the imager wafer, may be fabricated on a lens wafer. The imager wafer and lens wafer are then assembled with the lens structures being optically aligned with the imager dies to form a plurality of imager modules which may then be separated into individual imager modules. Alternatively, the lens and image sensor can be assembled on die level.

Lens systems for microelectronic imagers should desirably correct for various lens imperfections, such as, for example, chromatic aberration and astigmatism. Chromatic aberration is caused by a lens having a different refractive index for different wavelengths of light and results in different wavelengths of light being focused on different positions. Astigmatism is increased with the increasing of thickness of a glass wafer. Astigmatism is a lens aberration in which horizontal and vertical lines are focused at two different points along the optical axis.

Known optical lens systems for correcting chromatic aberration and astigmatism can be complex and costly and difficult to produce particularly at the sizes needed for image sensors. Accordingly, there is a need for an optical lens that is more easily manufactured and which corrects for these lens distortions.

BRIEF DESCRIPTION OF THE DRAWINGS

FIGS. 10(a)-10(g) illustrate conventional configurations of a glass lens wafer.

DETAILED DESCRIPTION OF THE INVENTION

Figure 1A:
FIGS. 1(a)-1(d) illustrate cross-sectional views depicting a portion of a glass lens wafer for an imaging module used in an embodiment at various stages of processing.
Figure 1B:
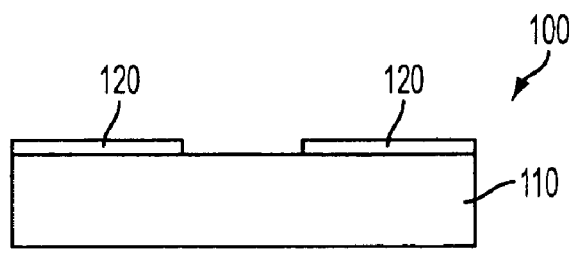
Figure 1C:
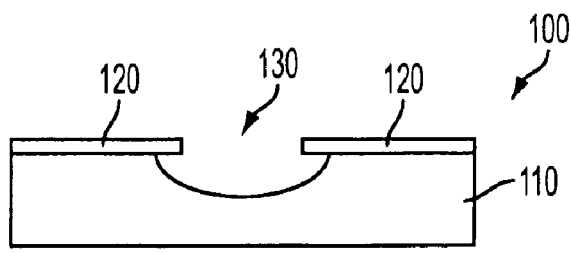
Figure 1D:
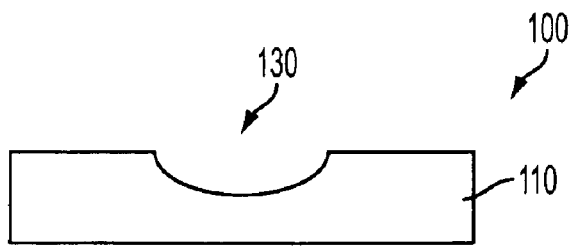

In the following description, reference is made to the accompanying drawings which form a part hereof, and in which are shown by way of illustrations specific embodiments that may be practiced. It should be understood that like reference numerals represent like elements throughout the drawings. These example embodiments are described in sufficient detail to enable those skilled in the art to practice them. It is to be understood that other embodiments may be utilized, and that structural, material and electrical changes may be made, only some of which are discussed in detail below, without departing from the spirit and scope of the invention.

Embodiments described herein relate to an over-molded glass lens that achieves accurate lens profiles on a waferscale with reduced effective wafer-thickness, improved image quality, and which can be fabricated to correct for lens chromatic aberration and astigmatism. In each embodiment, a polymer material is deposited and molded onto a formed glass lens wafer to form an over-molded glass lens. The deposited polymer material fills or covers cavities or bumps formed in, or on, the glass lens wafer. When the deposited polymer material shares the same optical properties (refractive index and dispersion) as the lens wafer, the over-molded glass lens has a restored surface quality, and thus obtains a more precise lens shape. When the deposited polymer material has different optical properties than the lens wafer, the polymer may provide for an achromatic correction.

Referring to FIGS. 1(a)-6(d), the initial formation of one component of an over-molded glass lens 100 used in some embodiments is now described. In these figures, various methods are described in forming an initial portion of a glass lens wafer 110, or alternatively a portion of another glass lens wafer 110'.

Referring to FIG. 1(*a*), a portion of a glass lens wafer 110 is shown. The lens wafer 10 may be formed of glass, for example, transparent silica glass or boro-silica glass or other glass material. The desired thickness of the lens wafer 110 is a balance between the thickness required to maintain the mechanical strength of the lens 100 and the thinness necessary to maintain the desired optical properties (e.g., avoiding astigmatism, which can increase with increased thickness of the glass wafer). Then, as shown in FIG. 1(*b*), a mask 120 is formed on the surface of the glass lens wafer 110. Using an isotropic wet etch or any other method known, the lens wafer 110 is etched to include a cavity 130, as shown in FIG. 1(*c*). The preferred method of forming the cavity may be by an isotropic wet etch because of its known cost benefits in forming negative lens profiles, but any known techniques can be used. In addition, although illustrated as a spherical cavity 130, it should be appreciated that the cavity 130 can be formed in any shape. The mask 120 is then removed, as depicted in FIG. 1(*d*), by any known method. A completed lens wafer 110 is provided having an etched concave shape therein. The shape of the cavity 130 provides a lens surface in the lens wafer 110.

Other cavity forming processes such as, e.g., glass molding and/or reactive ion etching ("RIE") with intermediate replication steps, e.g., electroforming, can achieve the same cavity 130 profile. For different types of lenses, other fabrication processes can be performed to obtain convex or concave profiles on glass lens wafer 110.

Figure 2A:
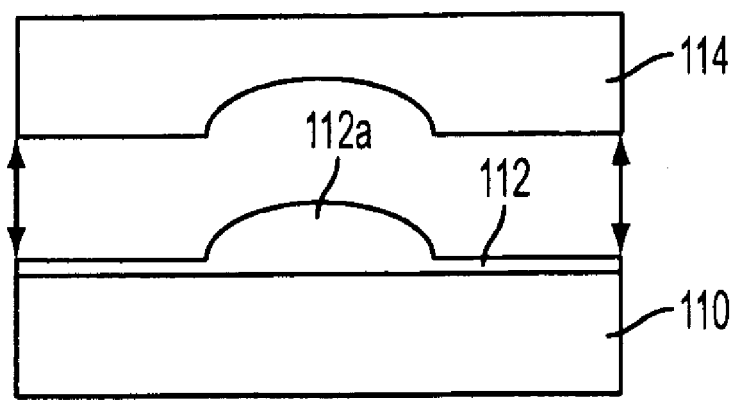
FIGS. 2(a)-2(c) illustrate cross-sectional views depicting a portion of a glass lens wafer for an imaging module used in another embodiment at various stages of processing.
Figure 2B:
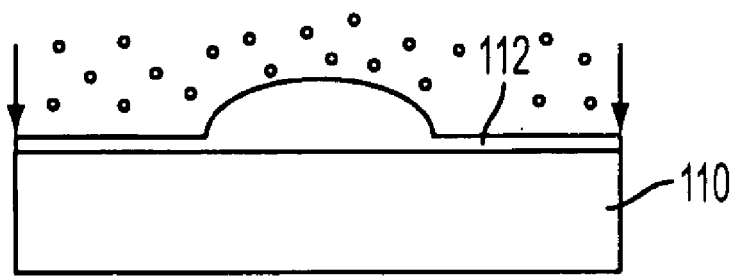
Figure 2C:
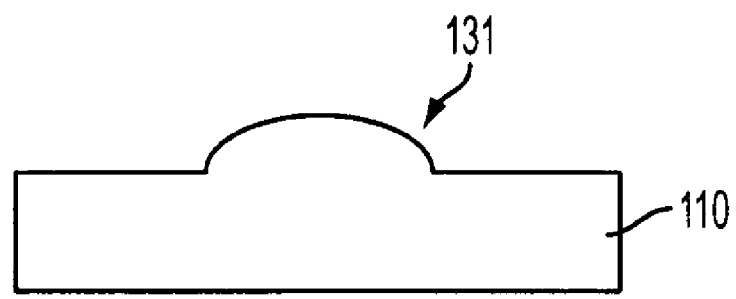
Figure 3A:
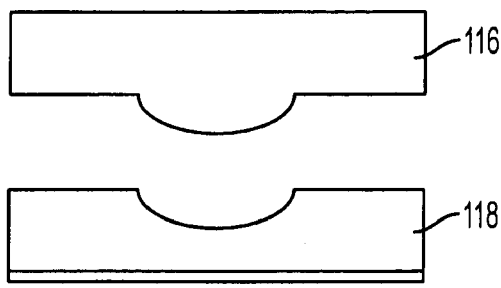
FIGS. 3(a)-3(d) illustrate cross-sectional views depicting a portion of a glass lens wafer for an imaging module used in another embodiment at various stages of processing.
Figure 3B:
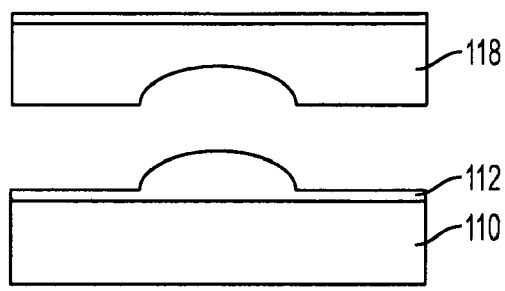
Figure 3C:
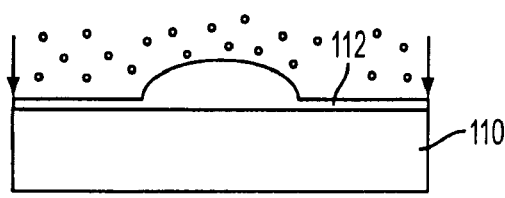
Figure 3D:
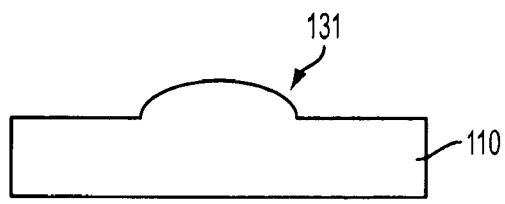
Figure 4A:
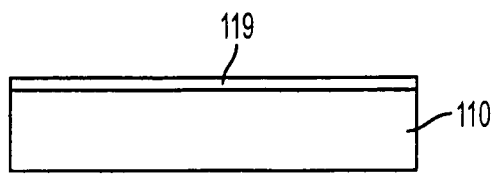
FIGS. 4(a)-4(e) illustrate cross-sectional views depicting a portion of a glass lens wafer for an imaging module used in another embodiment at various stages of processing.
Figure 4B:
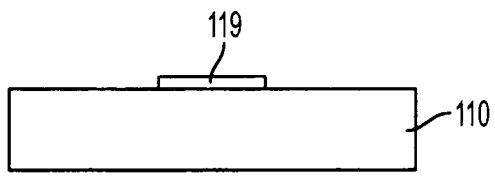
Figure 4C:
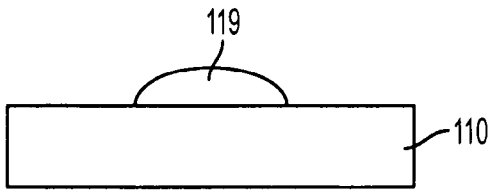
Figure 4D:
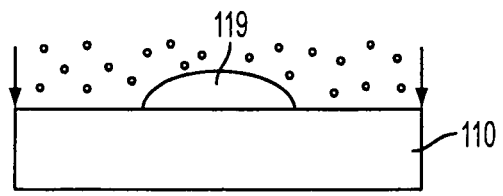
Figure 4E:
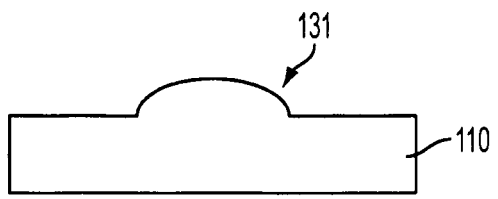
Figure 5A:
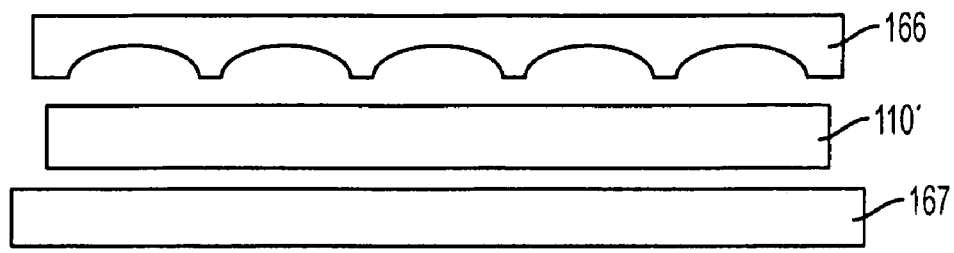
FIGS. 5(a)-5(d) illustrate cross-sectional views depicting a portion of a glass lens wafer for an imaging module used in another embodiment at various stages of processing.
Figure 5B:
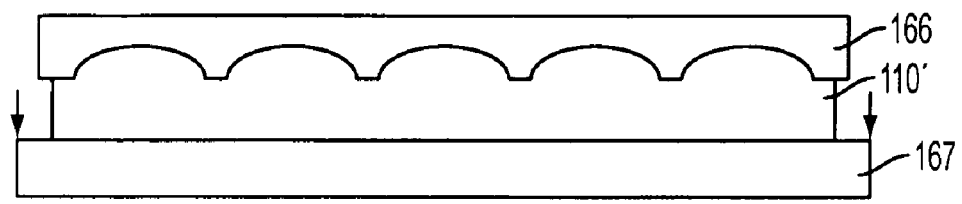
Figure 5C:
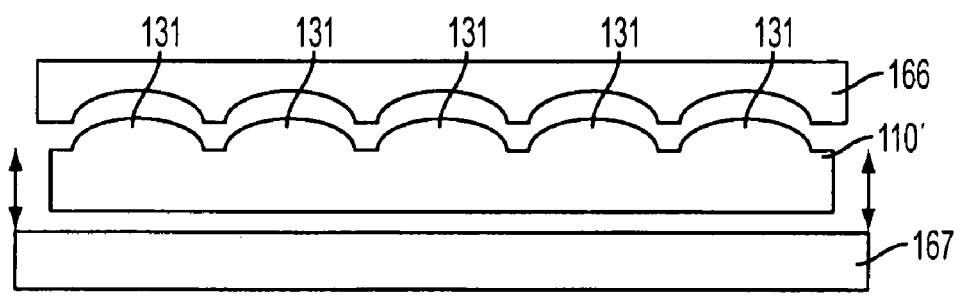
Figure 5D:
Figure 6A:
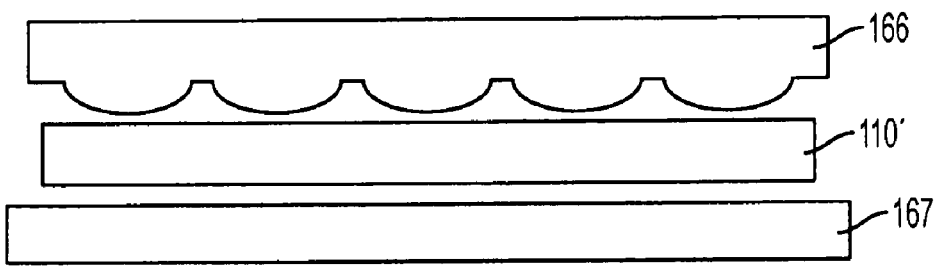
FIGS. 6(a)-6(d) illustrate cross-sectional views depicting a portion of a glass lens wafer for an imaging module used in another embodiment at various stages of processing.
Figure 6B:
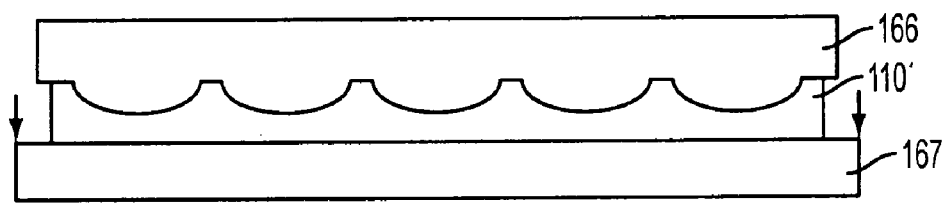
Figure 6C:
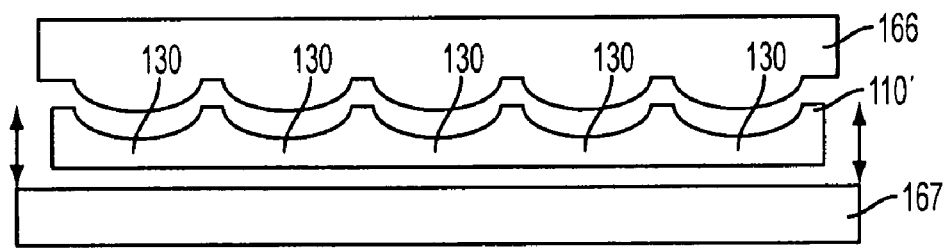
Figure 6D:

For example, as shown in FIG. 2(*a*), an isotropic etched master from a stamp 114 can be applied onto a resist or lens polymer 112 provided on glass lens wafer 110 to form a lens shaped bump 112*a*. The polymer 112 has a 1:1 etch selectivity to the glass lens wafer 110. Then, referring to FIG. 2(*b*), an RIE etch is used to transfer a profile, e.g., bump 131, onto the glass lens wafer 110, providing a completed lens wafer 110 having convex lens shapes thereon. See FIG. 2(*c*).

In another example, as shown in FIG. 3(*a*), a diamond turned or electroformed or other master stamp technique (e.g., using a master stamp 116) can be used to stamp a profile 118 onto a substrate which may then be used to form the glass lens wafer 110. Referring to FIG. 3(*b*), the stamped profile 118 is transferred into a lens polymer or resist 112 provided on glass lens wafer 110 and then an RIE etch may be used to form a lens profile 131 on the glass lens wafer 110 (See FIG. 3(*c*)). Again, referring to FIG. 3(*d*), this forms a completed lens wafer 110 having convex etched lens shapes thereon.

In yet another example, a spin or spray coat resist masking polymer 119 can be applied onto a glass lens wafer 110 (See FIG. 4(*a*)). The resist masking polymer 119 is photo-patterned for the lens and a resist reflow is used to form the lens profile, e.g., bump 131, as shown in FIGS. 4(*b*) and 4(*c*). Subsequently, in FIG. 4(*d*), an RIE etch is used to transfer the formed lens profile into the glass lens wafer 110 providing a completed lens wafer 110 having an etched convex shape (See FIG. 4(*e*)). It should be appreciated that the same or at least similar processes can be used to fabricate concave lens shapes as is known in the art.

In each of the embodiments described with reference to FIGS. 1(*a*) through 4(*e*) when a lens wafer has a concave etched lens shape, the lens wafer is created with lens structures and with the wafer substrate itself being thinned as part of the lens structure fabrication. Accordingly, astigmatism in the overall lens structure can be reduced. Although FIGS. 1(*a*) through 4(*e*) show formation of a single lens on lens wafer 110, it should be appreciated that in practice a plurality of such lens are formed over the surface of lens wafer 110.

Referring to FIGS. 5(*a*)-6(*d*), another method of forming a portion of a glass lens wafer 110' is now described. FIGS. 5(*a*)-6(*d*) show formation of a plurality of lenses on a lens wafer. In this embodiment, initial glass lens wafer 110' is fabricated using precision machined or electro-formed stamps. For example, referring to FIGS. 5(*a*)-5(*d*), in order to form convex lenses on a lens wafer, a lens profile can be formed using a machined top embossing stamp (i.e., mold plate) 166, a glass lens wafer 110' and a base plate 167, as shown in FIG. 5(*a*). In this process, heat and pressure are applied to a glass lens wafer 110' using the stamp 166 and the base plate 167 to soften the glass (See FIG. 5(*b*)). Once softened, the glass lens wafer 110' can be molded into the desired shape, e.g., bump 131, for a convex lens structure for the wafer. Then, as shown in FIG. 5(*c*), the base plate 167 and embossing stamp 166 are released providing a completed molded convex lens wafer 110' (See FIG. 5(*d*)).

In another example, referring to FIGS. 6(*a*)-6(*d*), for concave lenses, as shown in FIG. 6(*a*) a similar machined top embossing stamp 166, glass wafer 110', and base plate 167 are used. Similarly, as shown in FIG. 6(*b*) heat and pressure are applied to the softened glass wafer 110'. The softened glass wafer 110' is then molded into the desired shape, e.g., cavity 130, for the lens array profiles. Again, the mold plate 166 and base plate 167 are released (FIG. 6(*c*)) creating a completed molded concave lens wafer 110' (FIG. 6(*d*)). It should be appreciated that a double sided process can also be used to make double sided lens array wafers. In addition, both simultaneous or sequential double sided processes can be used. It should be appreciated that the formed lens structures/surfaces can comprise an unlimited number of combinations having convex and concave shapes as well as plano surfaces.

In the embodiments illustrated for forming glass lens wafers 110 or 110' having a concave etched lens shape thereon, the formed glass lens wafers have an advantageous low thickness which, as noted, improves astigmatism performance of a lens structure in the lens wafer 110 or 110'.

Additionally, undesired lens surface roughness and surface deviation may be present. The surface roughness of an etched cavity or bump is known to be coarse and uneven and the surface may be deformed compared to the intended one. Thus, an over-molded polymer coating 170 is provided to mitigate against surface roughness and surface deformation. Once the etched or molded lens profile (cavity 130 or bump 131) is established into or onto the glass lens wafer 110 or 110' (as described above), a polymer coating 170 is then applied as described in more detail below.

Figure 7A:
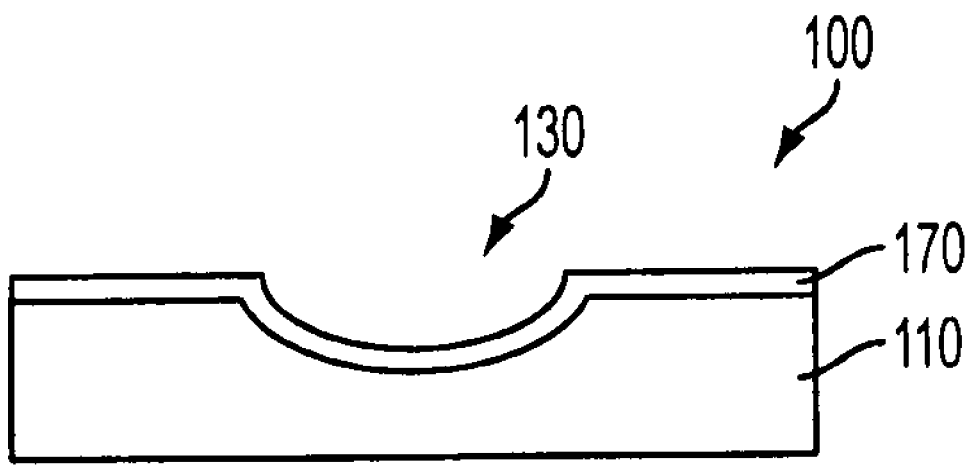
FIG. 7(a) illustrates a cross-sectional view of an embodiment described herein.
Figure 7B:
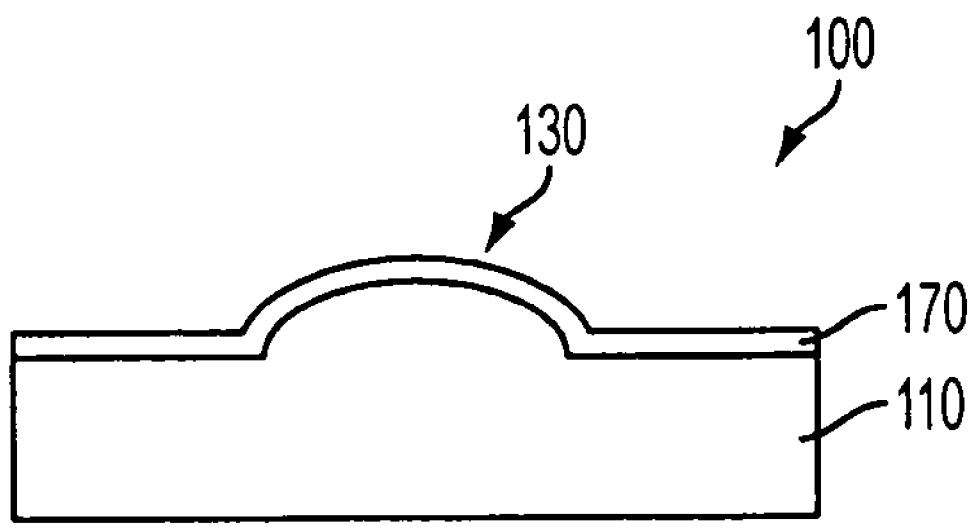
FIG. 7(b) illustrates a cross-sectional view of another embodiment described herein.
Figures 11A, 11B:
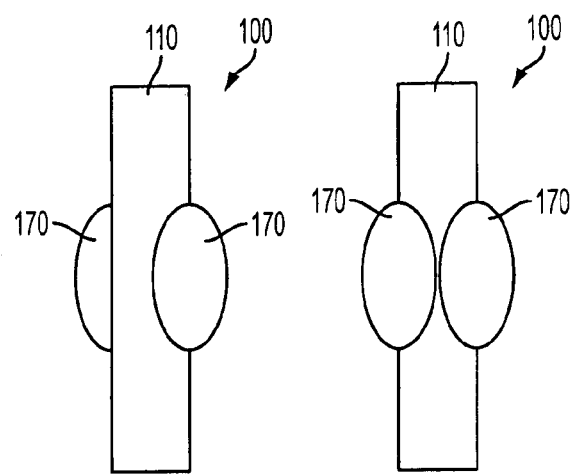
FIGS. 11(a)-11(i) illustrate various configurations of a glass lens wafer in accordance with the embodiments described herein.
Figures 11C, 11D, 11E:
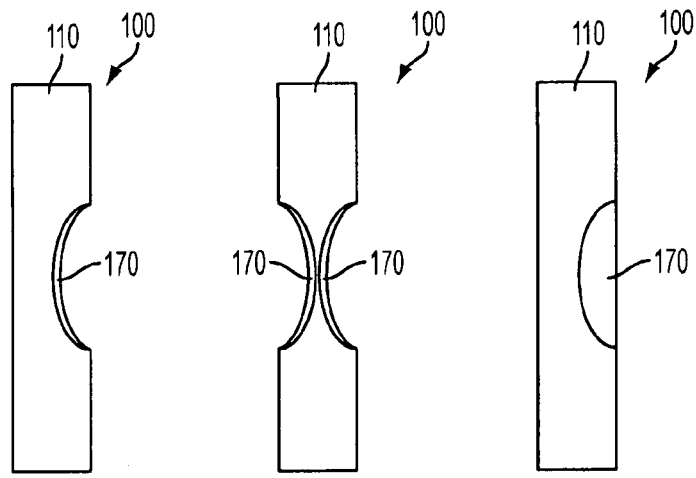
Figures 11F, 11G, 11H, 11I:
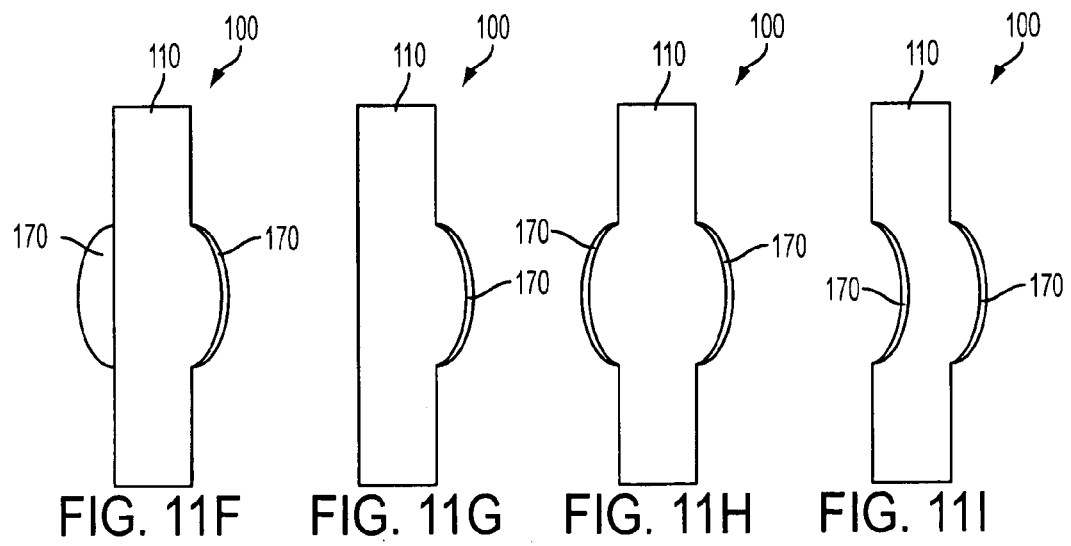

As shown in FIGS. 7(*a*) and 7(*b*), an over-molded glass lens 100 is formed on the glass lens wafer 110 or 110', each having a polymer coating 170 formed on the surface of the glass lens wafer 110 (or 110') over the area of the wafer containing a lens profile. Many different configurations of the molded lens structures may be fabricated using the lens wafers 110 or 110' having concave or convex lens structures on one or both substrate surfaces. Examples of completed over-molded glass lens 100 configurations are shown in FIGS. 11(*a*)-11(*i*) (which can be compared with conventional wafer level glass substrate configurations illustrated in FIGS. 10(*a*)-10(*g*) which do not have an overmolded structure).

Referring back to FIGS. 7(*a*) and (7(*b*), the over-molded glass lens 100 may be formed by applying any polymer coating 170, having a desired refractive index and dispersion characteristic, to the surface of a glass lens wafer 110 or 110'. The polymer coating 170 can be made of a polymer material having a similar refractive index and dispersion characteristics to the material comprising the glass lens wafer 110 or 110' to get a smooth and accurate lens profile. The polymer coating 170 can also be formed using different refractive materials and/or dispersion characteristics than that forming the glass lens wafer 110 or 110', i.e., different refractive indices and Abbe numbers. The lens arrangement, with the glass lens wafer 110 (or 110') and the polymer coating 170 having different refractive indices and dispersions, allows the formation of an achromatic wafer-level lens structure, thereby correcting for chromatic aberration.

Figure 8A:
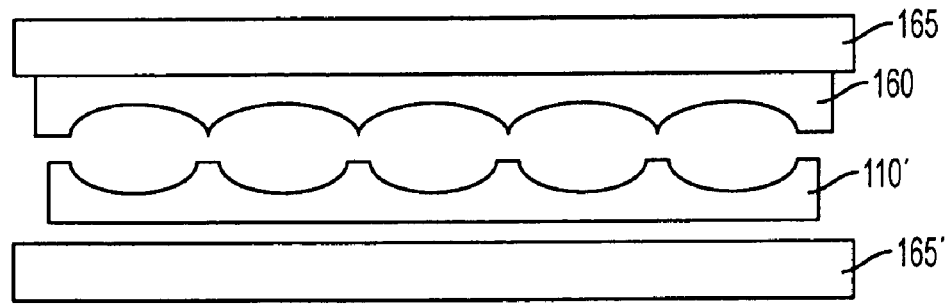
FIGS. 8(a)-8(d) illustrate cross-sectional views depicting a portion of a glass lens wafer for an imaging module used in another embodiment at various stages of processing
Figure 8B:
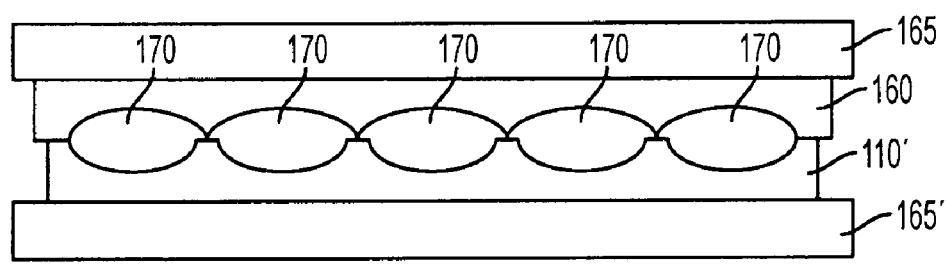
Figure 8C:
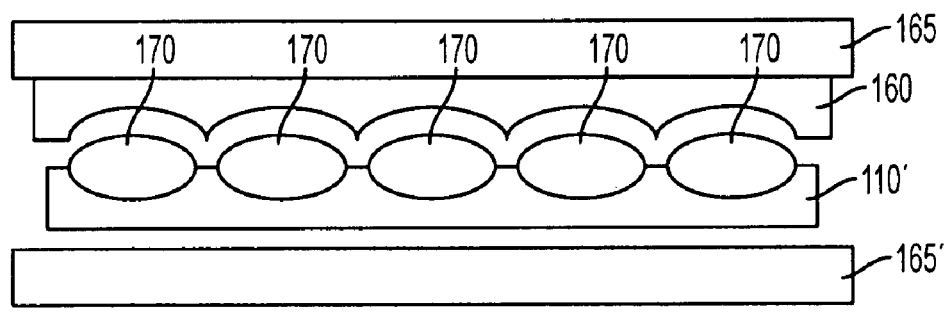
Figure 8D:
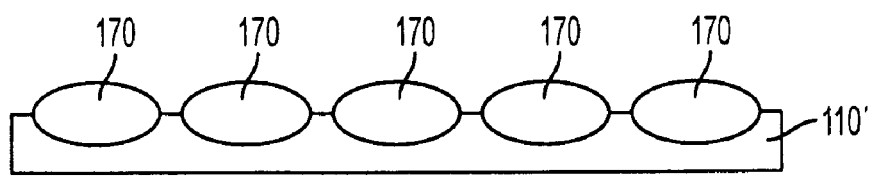
Figure 9A:
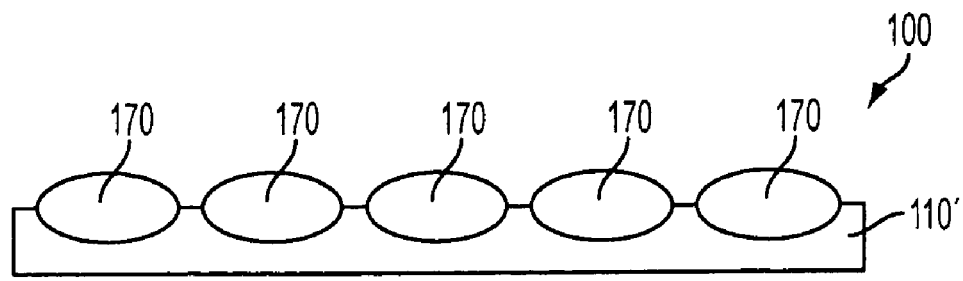
FIGS. 9(a)-9(d) illustrate various configurations of a glass lens wafer in accordance with the embodiments described herein.
Figure 9B:
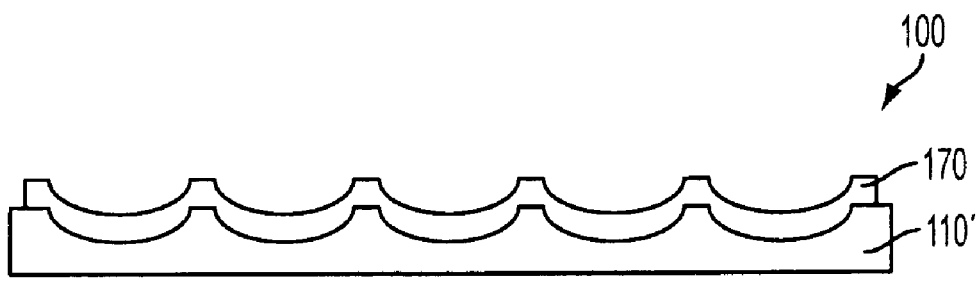
Figure 9C:
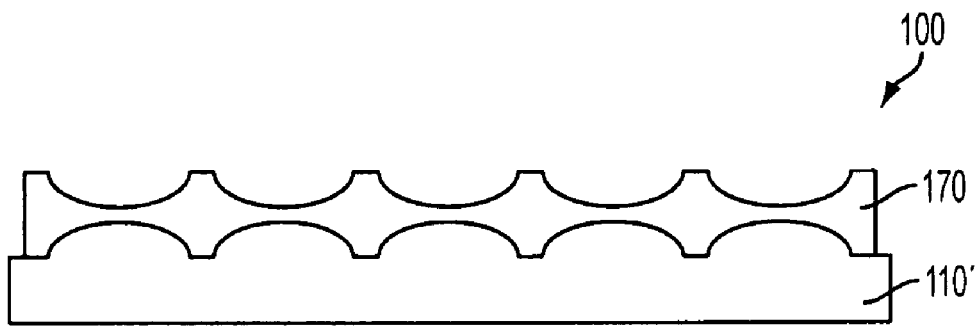
Figure 9D:
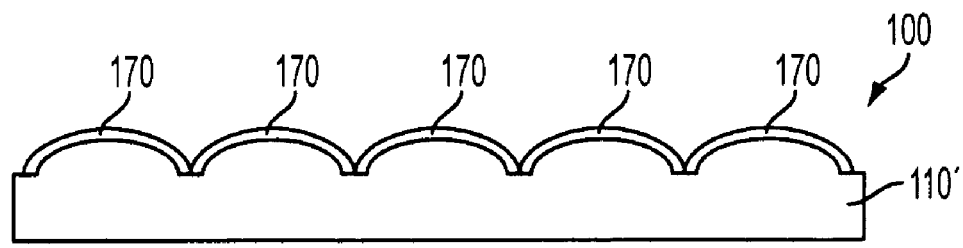

Further examples of forming an overmolded glass wafer with associate lens structure are now described. All embodiments include depositing an over-mold polymer coating, to the glass lens wafer 110 or 110'. Referring first to FIG. 8(a), once a glass molded lens wafer 110' (or 110) is formed with a patterned stamp, it is then aligned between a mold plate 160 (attached to a first base plate 165), and a second base plate 165' for polymer overmolding. One overmolding technique which may be used is ultra-violet (UV) imprint replication. A UV-curable molding polymer 170 is dispensed between glass molded lens array 110' and mold plate 160 and cured on the surface of the glass molded lens wafer 110' or 110 (FIG. 8(b)) after the mold plate is moved towards glass lens wafer 110' or 110. This can be accomplished using for example UV imprint lithography, but may also be accomplished by any other appropriate methods of molding. It should be appreciated, however, that the UV-curable molding polymer is only an example material that may be used. In fact, any known molding polymer can be used. In the alternative to imprinting the molding polymer, dispensing a polymer coating and using surface tension to produce an improved smooth surface is possible and, depending on the boundary constraints, small shape deviation in the formed cavity or bump can be achieved. In addition, it should be appreciated that a low transparency photoresist can also be used. The mold plate 160, as illustrated in FIG. 8(c), is then released and removed after forming a completed over-molded glass lens wafer 100 as shown in FIG. 8(d). It should be appreciated that there are several configurations that can result from this same method. For example, referring to FIGS. 9(a)-9(d), a convex-concave lens combination (FIG. 9(a)), concave-concave lens combination (FIG. 9(b)), concave-convex lens combination (FIG. 9(c)), and a convex-convex lens combination (FIG. 9(d)) of an over-molded glass lens 100 can be achieved by forming the glass lens wafer 110 or 110', and the polymer coating 170 layers using different molds and glass wafers having concave or convex lens profiles. FIG. 9(a) illustrates a convex-shaped polymer coating 170 over a concave-shaped glass lens wafer 110' (or 110). FIG. 9(b) illustrates a concave-shaped polymer coating 170 over a concave-shaped glass lens wafer 110' (or 110). FIG. 9(c) illustrates a concave-shaped polymer coating 170 over a convex-shaped glass lens wafer 110' (or 110). FIG. 9(d) illustrates a convex-shaped polymer coating 170 over a convex-shaped glass lens wafer 110' (or 110). It should be appreciated that this is not an exhaustive list of possible overmolded lens configurations which can be created and any other double-sided combinations.

FIGS. 11(a)-11(i) illustrate a number of example over-molded glass lens 100 configurations formed using a glass lens wafer 110 or 110' and a similar overmolding method as described above. Some configurations of the over-molded glass lens 100 include a concave-shaped polymer coating 170 (e.g., FIGS. 11(c), 11(d), 11(e), 11(i)) while others include a convex-shaped polymer coating 170 (e.g., FIGS. 11(a), 11(b), 11(f), 11(g), 11(h)). Some configurations of the over-molded glass lens 100 include a glass lens wafer 110 or 110' having a bump lens profile 131 (FIGS. 11(f), 11(g), 11(h), 11(i)), and some include a glass lens wafer 110 or 110' having a cavity lens profile 130 (FIGS. 11(a), 11(b), 11(c), 11(d), 11(e), 11(i)). It should be appreciated that this too is not an exhaustive list of overmolded lens configurations which can be achieved. It should also be appreciated that various combinations of glass wafers and polymer lens structures can be formed on one or both sides of the lens wafer. It should be appreciated that the over-molded glass lens 100 can also be formed to comprise a polymer coating over a lens structure having a plano, surface, e.g., FIGS. 11(a), 11(e) and 11(f) comprise a polymer coating on a plano lens surface.

The completed over-molded glass lens 100 can be formed using a number of materials for the glass wafer substrate and the polymer. For example, the table below reflects a number of sample materials that can be used to form glass lens wafer 110 or 110', overcoated with a polymer coating 170. The materials listed in the following table should not be interpreted as limiting, but are instead merely examples of the possible materials that can be used.

TABLE

| Material | n @ 633 nm | Abbe number |
|---|---|---|
| Glass | | |
| B33 | 1.47 | 65 |
| D263T | 1.52 | 55 |
| SF13 | 1.735 | 28 |
| Polymer | | |
| Ormocomp ® | 1.52 | 52 |
| Ormocore ® | 1.55 | 31 |
| Polymethyl Methacrylate (PMMA) | 1.49 | 58 |
| Polycarbonate | 1.58 | 13 |

When the same or similar optical properties are desired to form an over-molded glass lens 100, improvements to surface quality and accuracy, and a low substrate thickness at an actual lens position can be achieved. For example, the wafer lens 110 or 110' can be formed by the glass material known as D263T, which has a refractive index of 1.52 and an Abbe number of 55. The polymer coating can be comprised of a material known as Ormocomp®, manufactured by Microresist Technology GmbH, Berlin, Germany, which has a refractive index of 1.52 and an Abbe number of 52. D263T and Ormocomp® have approximately the same optical properties and therefore provided a good combination in providing an over-molded glass lens wafer array having lens shape deviation compensation. The important aspect to note is that either the refractive index or the Abbe number of both materials are approximately the same, i.e., within a range of 10% of each other and exhibit similar optical properties. In such an application, the interface between materials virtually vanishes.

Different optical properties (dispersion) can be used for the glass and polymer to form an over-molded glass lens 100, for correcting chromatic aberration while providing a low substrate thickness. In this configuration, the over-molded glass lens wafer would be a flint (defined below) and the polymer coating a crown (defined below). It should also be appreciated that the opposite can exist as well; that is, the glass lens wafer could be a crown and the molding polymer a flint. The important feature is forming an over-molded lens structure consisting of a flint and a crown. A flint is defined as a material that exhibits high dispersive characteristics, and a crown is defined as a material exhibiting low dispersive characteristics. The dispersive characteristics is given by a material's Abbe number. High dispersion (low refractivity) material corresponds to low Abbe numbers (≦50), and low dispersion material (high refractivity) corresponds to high Abbe number (≦50).

For example, the lens wafer 110 or 110' can be formed using the glass material known as B33, which has an Abbe number of 65 and a refractive index of 1.47. The polymer coating can be a material known as Ormocore®, manufactured by Microresist Technology GmbH, Berlin, Germany, which has an Abbe number 31 and a refractive index of 1.55. Since, B33 and Ormocore® have optically different (opposing) optical properties and therefore provide a good combination for forming a lens structure which corrects for chromatic aberration. In another example, the glass material SF13 has an Abbe number of 28 and a refractive index of 1.735. The molding polymer known as PMMA has an Abbe number of 58 and a refractive index of 1.49. Thus, SF13 and PMMA have optically different optical properties and provide another good combination for achromatization. Although the embodiments described herein refer to a glass wafer level substrate, it should be equally appreciated that polycarbonates (refractive index of 1.58 and an Abbe number of 13) can also be used to form the lens wafer 110 or 110' and then combined with a polymer coating 170, for instance, Ormocomp®.

Figure 12:
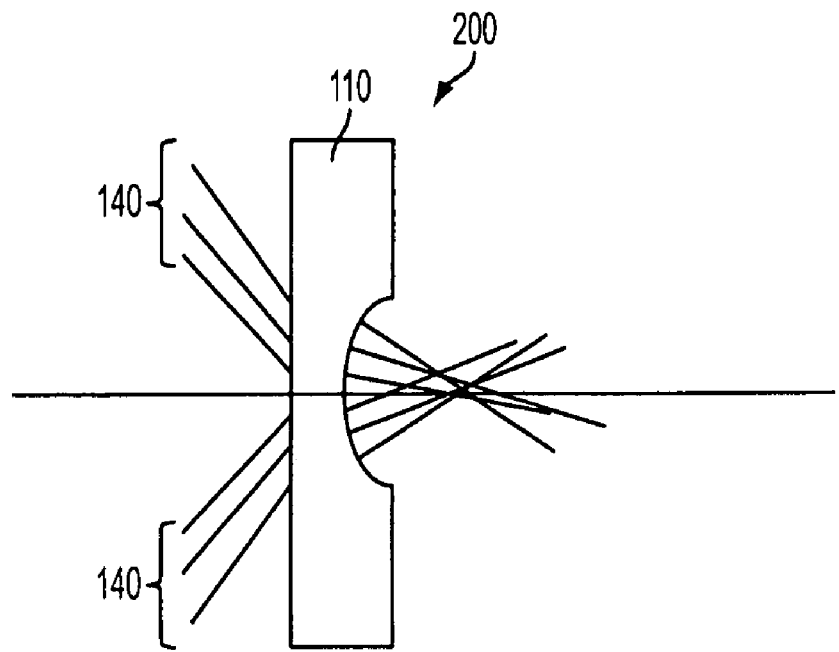
FIG. 12 illustrates a cross-sectional view of a conventional lens system.
Figure 13:
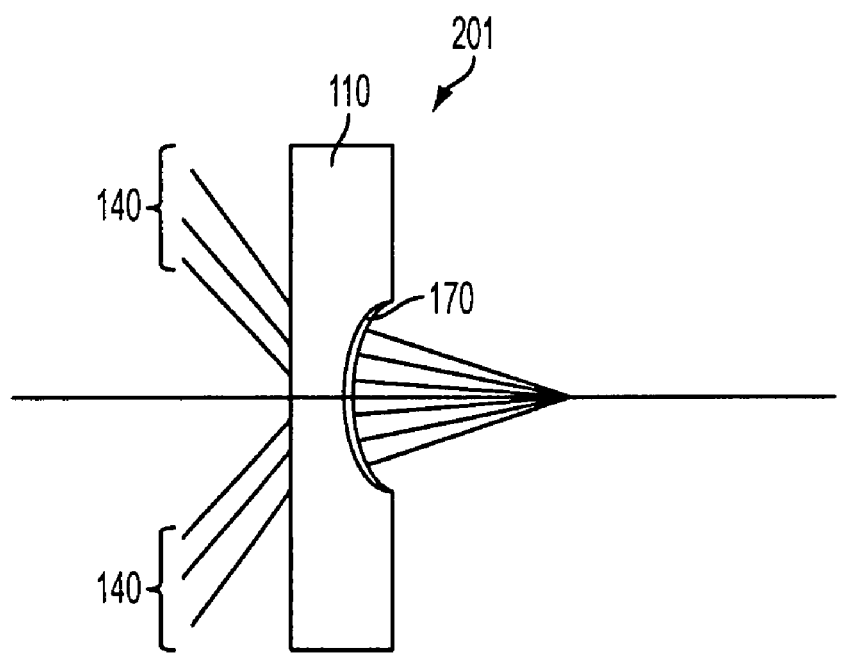
FIG. 13 illustrates a cross-sectional view of a lens system in accordance with an embodiment described herein.

FIG. 12 illustrates a conventional wet etched or otherwise replicated (molded) glass lens profile 200 showing the results of having surface roughness. As can be seen, the poor lens profile 200 results in poor wavefront quality. The received light/image 140 is not focused onto the same or desired focal point. FIG. 13 illustrates an example in accordance with the embodiments described herein having a polymer coating 170 formed on a glass lens wafer 110 or 110' of similar optical properties. As shown in FIG. 13, a polymer overcoated lens structure 201 corrects for the roughness and shape deviation exhibited by the conventional lens profile illustrated in FIG. 12. The polymer overcoated lens structure 201 exhibits improved wavefront quality, i.e., small ray deviation which is a result of achieving an improved surface roughness and low shape deviation. The polymer overcoated lens structure 201 of FIG. 13 provides the advantages of improved wavefront quality and improved image quality. It should be noted that the interface between the glass lens wafer 110 or 110' and the polymer coating 170 is optically non-existent.

Figure 14:
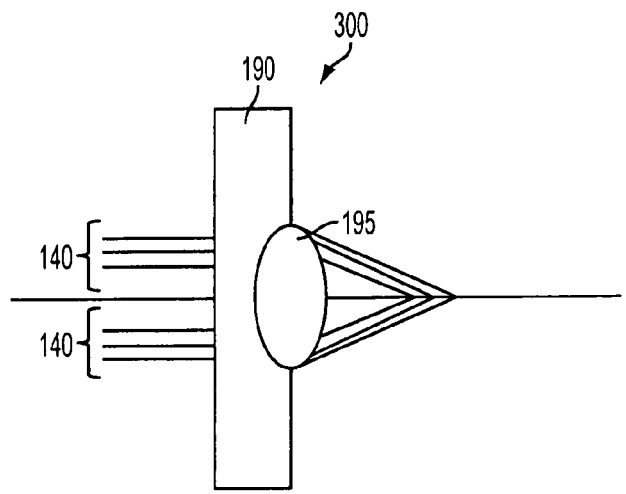
FIG. 14 illustrates a cross-sectional view of a conventional lens system.
Figure 15:
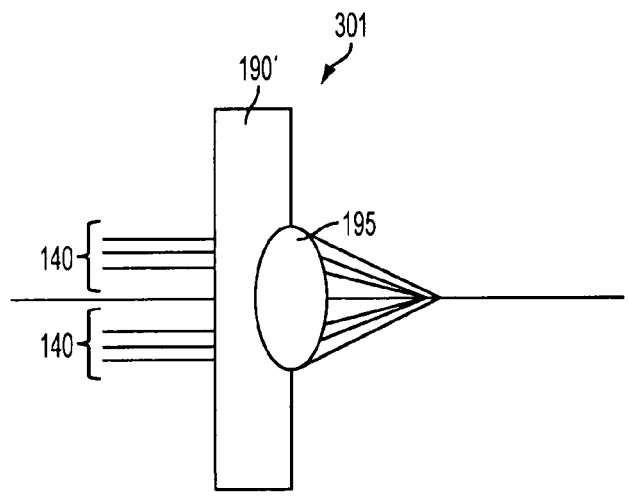
FIG. 15 illustrates a cross-sectional view of a lens system in accordance with another embodiment described herein.
Figure 16:
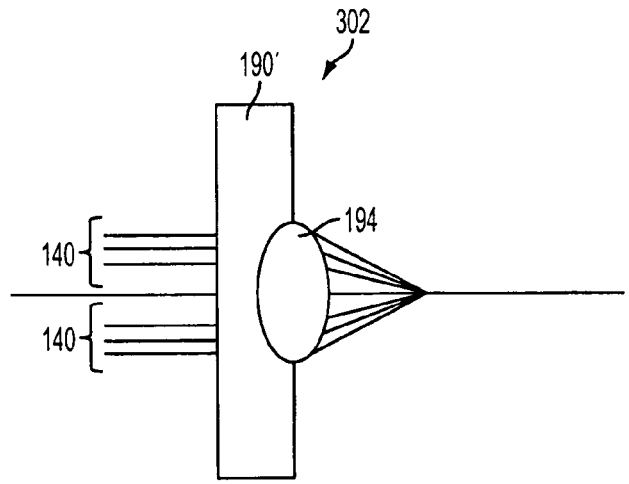
FIG. 16 illustrates a cross-sectional view of a lens system in accordance with another embodiment described herein.

A conventional glass lens profile 300, as illustrated in FIG. 14, exhibits no achromatization (i.e., correction for chromatic aberration) due to the plano surface between the substrate and the lens. The glass lens profile 300 comprises a thick glass wafer 190 and a lens structure 195. As shown and noted above, the lens structure 195 will exhibit chromatic aberration. In fact, lateral and axial color separation occurs due to dispersion on the curved lens profile of lens structure 195. FIG. 15 illustrates an improved glass lens profile 301 exhibiting achromatization. The achromatization is a result of a formed thinned substrate 190' in accordance with the embodiments described above. For example, the curved interface between the glass wafer and polymer coating have different Abbe numbers. As shown, the glass lens profile 301 exhibits improved wavefront quality. It should be appreciated that there is no restriction to a particular shape as illustrated in the embodiments described herein. Glass lens profile 301 brings minimum and maximum wavelengths 140 to overlap, correcting for some chromatic aberration; however if conventional materials are used, the secondary spectrum remains visible. FIG. 16 shows another improved glass lens profile 302 where achromatization can be accomplished including correcting the secondary spectrum. Glass lens profile 302 comprises a thinned substrate 190' and a molding polymer 194 where at least one of the materials 190' or 194 has anomalous dispersion. When using different optical properties for the thinned substrate 190' in combination with the molding polymer 194, improved polychromatic wavefront quality and secondary spectrum correction is accomplished. Glass lens profile 302 can be formed in accordance with the embodiments described herein.

Embodiments described herein comprise generating an over-molded glass lens 100 by etching (i.e., isotropic or RIE) or molding a spherical lens profile on a glass lens wafer 110 or 110'; and forming a polymer coating 170 on the surface of the glass lens wafer 110 or 110'. The overmolded polymer has similar or different optical properties as the underlying glass wafer.

Embodiments described herein also comprise thinning the glass wafer by etching and forming a lens profile prior to providing a polymer overmolding.

The above description and drawings illustrate embodiments which achieve the objects, features and advantages described. Although certain advantages and embodiments have been described above, those skilled in the art will recognize that there may be many others. For example, the steps in the methods described herein may be performed in different orders, or may include some variations, such as alternative materials having similar functions. Accordingly, the invention is not limited by the embodiments described herein but is only limited by the scope of the appended claims.

What is claimed as new and desired to be protected by Letters Patent of the United States is:

1. An optical lens comprising:
    a substrate formed of a first refractive material having a first optical property and forming a plurality of lens surfaces; and
    a coating formed of a second refractive material having a second optical property formed on the plurality of lens surfaces, wherein the substrate is formed to have a thinned lens structure such that astigmatism is reduced and the coating is applied such that the smoothness of the plurality of lens surfaces is improved, wherein the first refractive material comprises a glass material and the second refractive material comprises a polymer, wherein the first optical property comprises a different optical property than the second optical property, and wherein the first and second optical properties are configured to correct for chromatic aberration.

2. The optical lens of claim 1, wherein the first and second optical properties have different refractive indices and Abbe numbers.

3. The optical lens of claim 1, wherein the polymer comprises a transparent UV-curable polymer.

4. The optical lens of claim 1, wherein the glass material comprises a concave lens profile.

5. The optical lens of claim 1, wherein the glass material comprises a convex lens profile.

6. An optical lens comprising:
    a substrate formed of a first refractive material having a first optical property and forming a plurality of lens surfaces; and
    a coating formed of a second refractive material having a second optical property formed on the plurality of lens surfaces, wherein the substrate is formed to have a thinned lens structure such that astigmatism is reduced and the coating is applied such that the smoothness of the plurality of lens surfaces is improved and wherein the first and second refractive materials comprise a crown.

7. An optical lens comprising:
a substrate formed of a first refractive material having a first optical property and forming a plurality of lens surfaces; and
a coating formed of a second refractive material having a second optical property formed on the plurality of lens surfaces, wherein the substrate is formed to have a thinned lens structure such that astigmatism is reduced and the coating is applied such that the smoothness of the plurality of lens surfaces is improved, wherein the first refractive material comprises a glass material and the second refractive material comprises a polymer and wherein the glass material comprises D263T and the polymer comprises Ormocomp®.

8. The optical lens of claim 6, wherein the plurality of lens surfaces comprises a plurality of concave lens profiles and wherein the formed second refractive material on the plurality of lens surfaces comprises a plurality of concave lens profiles.

9. The optical lens of claim 6, wherein the plurality of lens surfaces comprises a plurality of convex lens profiles and wherein the formed second refractive material on the plurality of lens surfaces comprises a plurality of convex lens profiles.

10. The optical lens of claim 6, wherein the plurality of lens surfaces comprises a plurality of convex lens profiles and wherein the formed second refractive material on the plurality of lens surfaces comprises a plurality of concave lens profiles.

11. The optical lens of claim 6, wherein the plurality of lens surfaces comprises a plurality of concave lens profiles and the formed second refractive material on the plurality of lens surfaces comprises a plurality of convex lens profiles.

* * * * *